United States Patent
McClellan et al.

(10) Patent No.: US 8,825,277 B2
(45) Date of Patent: Sep. 2, 2014

(54) SYSTEM AND METHOD FOR THE COLLECTION, CORRELATION AND USE OF VEHICLE COLLISION DATA

(75) Inventors: Scott McClellan, Heber City, UT (US); Todd Follmer, Coto de Caza, CA (US)

(73) Assignee: inthinc Technology Solutions, Inc., West Valley City, UT (US)

( * ) Notice: Subject to any disclaimer, the term of this patent is extended or adjusted under 35 U.S.C. 154(b) by 105 days.

(21) Appl. No.: 11/758,508

(22) Filed: Jun. 5, 2007

(65) Prior Publication Data

US 2008/0306996 A1    Dec. 11, 2008

(51) Int. Cl.
| | |
|---|---|
| *G01M 17/00* | (2006.01) |
| *G06F 7/00* | (2006.01) |
| *G06F 19/00* | (2011.01) |
| *G06Q 10/06* | (2012.01) |

(52) U.S. Cl.
CPC ..................... *G06Q 10/06* (2013.01)
USPC ........ 701/32.2; 701/32.3; 701/33.4; 701/34.2

(58) Field of Classification Search
USPC ......... 701/29, 35, 117, 31.4, 32.2, 32.3, 32.4, 701/33.3, 33.4, 34.2, 424, 540, 300
See application file for complete search history.

(56) References Cited

U.S. PATENT DOCUMENTS

| | | | |
|---|---|---|---|
| 3,975,708 A | 8/1976 | Lusk | |
| 4,369,427 A | 1/1983 | Drebinger et al. | |
| 4,395,624 A | 7/1983 | Wartski | |
| 4,419,654 A | 12/1983 | Funk | |
| 4,458,535 A | 7/1984 | Juergens | |
| 4,785,280 A | 11/1988 | Fubini | |
| 4,926,417 A | 5/1990 | Futami | |
| 4,939,652 A | 7/1990 | Steiner | |
| 5,032,821 A | 7/1991 | Domanico | |
| 5,119,504 A | 6/1992 | Durboraw, III | |
| 5,172,785 A * | 12/1992 | Takahashi | ..................... 180/271 |
| 5,223,844 A | 6/1993 | Mansell et al. | |
| 5,225,842 A | 7/1993 | Brown et al. | |
| 5,303,163 A | 4/1994 | Ebaugh et al. | ................. 364/550 |
| 5,305,214 A | 4/1994 | Komatsu | |
| 5,309,139 A | 5/1994 | Austin | |
| 5,311,197 A | 5/1994 | Sorden et al. | |

(Continued)

FOREIGN PATENT DOCUMENTS

| | | | |
|---|---|---|---|
| CA | 2071931 | 12/1993 | |
| DE | 197 00 353 A1 | 7/1998 | ............. B60K 28/00 |

(Continued)

OTHER PUBLICATIONS

Abbreviated Injury Scale table.*

(Continued)

*Primary Examiner* — Rami Khatib
(74) *Attorney, Agent, or Firm* — Workman Nydegger

(57) ABSTRACT

System and method for collecting and using vehicle data. Crash data is received from a plurality of vehicle monitoring devices and added to a crash data database. The database is updated with additional information gathered from specific crashes. The crash data is correlated based upon a vehicle type parameter. Crash data parameters associated with one or more injury severity thresholds are identified. Alternatively, crash data parameters associated with one or more vehicle damage severity thresholds are identified. Injury and property damage estimates for subsequent crashes are made based upon the information collected in the crash database.

28 Claims, 4 Drawing Sheets

(56) References Cited

U.S. PATENT DOCUMENTS

| | | | |
|---|---|---|---|
| 5,317,503 A * | 5/1994 | Inoue | 700/90 |
| 5,325,082 A | 6/1994 | Rodriguez | |
| 5,347,260 A | 9/1994 | Ginzel | |
| 5,359,528 A | 10/1994 | Haendel | |
| 5,365,114 A * | 11/1994 | Tsurushima et al. | 307/10.1 |
| 5,365,451 A | 11/1994 | Wang et al. | |
| 5,394,136 A | 2/1995 | Lammers et al. | |
| 5,400,018 A | 3/1995 | Scholl | |
| 5,414,432 A | 5/1995 | Penny, Jr. et al. | |
| 5,422,624 A | 6/1995 | Smith | |
| 5,424,584 A | 6/1995 | Matsuda | |
| 5,430,432 A | 7/1995 | Camhi | |
| 5,436,612 A | 7/1995 | Aduddell | |
| 5,436,837 A | 7/1995 | Gerstung | |
| 5,446,659 A | 8/1995 | Yamawaki | |
| 5,453,939 A | 9/1995 | Hoffman | |
| 5,457,439 A | 10/1995 | Kuhn | |
| 5,475,597 A | 12/1995 | Buck | |
| 5,485,161 A | 1/1996 | Vaughn | |
| 5,499,182 A | 3/1996 | Ousborne | |
| 5,521,579 A | 5/1996 | Bernhard | |
| 5,521,580 A | 5/1996 | Kaneko | |
| 5,525,960 A | 6/1996 | McCall | |
| 5,548,273 A | 8/1996 | Nicol | |
| 5,581,464 A | 12/1996 | Woll | |
| 5,586,130 A | 12/1996 | Doyle | |
| 5,600,558 A | 2/1997 | Mearek | |
| 5,612,875 A | 3/1997 | Haendel | |
| 5,625,337 A | 4/1997 | Medawar | |
| 5,638,077 A | 6/1997 | Martin | |
| 5,642,284 A | 6/1997 | Parupalli | |
| 5,648,755 A | 7/1997 | Yagihashi | |
| 5,659,289 A | 8/1997 | Zonkoski | |
| 5,689,067 A | 11/1997 | Klein | |
| 5,708,417 A | 1/1998 | Tallman | |
| 5,717,374 A | 2/1998 | Smith | |
| 5,719,771 A | 2/1998 | Buck | |
| 5,723,768 A | 3/1998 | Ammon | |
| 5,740,548 A | 4/1998 | Hudgens | |
| 5,742,915 A | 4/1998 | Stafford | |
| 5,751,245 A | 5/1998 | Janky et al. | |
| 5,764,139 A | 6/1998 | Nojima | |
| 5,767,767 A | 6/1998 | Lima | |
| 5,777,580 A | 7/1998 | Janky et al. | |
| 5,795,997 A | 8/1998 | Gittins | |
| 5,797,134 A | 8/1998 | McMillan et al. | |
| 5,801,618 A | 9/1998 | Jenkins | |
| 5,801,948 A | 9/1998 | Wood | |
| 5,815,071 A | 9/1998 | Doyle | |
| 5,825,283 A | 10/1998 | Camhi | |
| 5,825,284 A | 10/1998 | Dunwoody | |
| 5,844,475 A | 12/1998 | Horie | |
| 5,847,271 A | 12/1998 | Poublon | |
| 5,862,500 A | 1/1999 | Goodwin | |
| 5,867,093 A | 2/1999 | Dodd | |
| 5,877,678 A | 3/1999 | Donoho | |
| 5,880,674 A | 3/1999 | Ufkes | |
| 5,880,958 A | 3/1999 | Helms et al. | |
| 5,883,594 A | 3/1999 | Lau | |
| 5,892,434 A | 4/1999 | Carlson | |
| 5,907,277 A | 5/1999 | Tokunaga | |
| 5,914,654 A | 6/1999 | Smith | |
| 5,918,180 A | 6/1999 | Dimino | |
| 5,926,087 A | 7/1999 | Busch | |
| 5,928,291 A | 7/1999 | Jenkins et al. | |
| 5,941,915 A | 8/1999 | Federle et al. | 701/1 |
| 5,945,919 A | 8/1999 | Trask | |
| 5,949,330 A | 9/1999 | Hoffman | |
| 5,949,331 A | 9/1999 | Schofield | |
| 5,954,781 A | 9/1999 | Slepian | |
| 5,955,942 A | 9/1999 | Slifkin | |
| 5,957,986 A | 9/1999 | Coverdill | |
| 5,964,816 A | 10/1999 | Kincaid | |
| 5,969,600 A | 10/1999 | Tanguay | |
| 5,974,356 A | 10/1999 | Doyle et al. | |
| 5,978,737 A | 11/1999 | Pawlowski | |
| 5,982,278 A | 11/1999 | Cuvelier | |
| 5,987,976 A | 11/1999 | Sarangapani | |
| 5,999,125 A | 12/1999 | Kurby | |
| 6,002,327 A | 12/1999 | Boesch | |
| 6,008,724 A | 12/1999 | Thompson | |
| 6,018,293 A | 1/2000 | Smith | |
| 6,026,292 A | 2/2000 | Coppinger et al. | |
| 6,028,508 A | 2/2000 | Mason | |
| 6,028,510 A | 2/2000 | Tamam | |
| 6,037,861 A | 3/2000 | Ying | |
| 6,037,862 A | 3/2000 | Ying | |
| 6,038,496 A | 3/2000 | Dobler | |
| 6,044,315 A | 3/2000 | Honeck | |
| 6,059,066 A | 5/2000 | Lary | |
| 6,064,928 A | 5/2000 | Wilson | |
| 6,064,970 A | 5/2000 | McMillan et al. | |
| 6,067,008 A | 5/2000 | Smith | |
| 6,067,009 A | 5/2000 | Hozuka | |
| 6,072,388 A | 6/2000 | Kyrtsos | |
| 6,073,007 A | 6/2000 | Doyle | |
| 6,075,458 A | 6/2000 | Ladner et al. | |
| 6,078,853 A | 6/2000 | Ebner | |
| 6,081,188 A | 6/2000 | Kutlucinar | |
| 6,084,870 A | 7/2000 | Wooten et al. | |
| 6,094,149 A | 7/2000 | Wilson | |
| 6,098,048 A | 8/2000 | Dashefsky | |
| 6,100,792 A | 8/2000 | Ogino | |
| 6,104,282 A | 8/2000 | Fragoso | |
| 6,108,591 A | 8/2000 | Segal et al. | |
| 6,121,922 A | 9/2000 | Mohan | |
| 6,124,810 A | 9/2000 | Segal et al. | |
| 6,130,608 A | 10/2000 | McKeown | |
| 6,131,067 A | 10/2000 | Girerd et al. | |
| 6,133,827 A | 10/2000 | Alvey | |
| 6,141,610 A | 10/2000 | Rothert | |
| 6,147,598 A | 11/2000 | Murphy | |
| 6,172,602 B1 | 1/2001 | Hasfjord | |
| 6,178,374 B1 | 1/2001 | Möhlenkamp et al. | 701/117 |
| 6,184,784 B1 | 2/2001 | Shibuya | |
| 6,185,501 B1 | 2/2001 | Smith | |
| 6,198,995 B1 | 3/2001 | Settles | |
| 6,204,756 B1 | 3/2001 | Senyk | |
| 6,204,757 B1 | 3/2001 | Evans | |
| 6,208,240 B1 | 3/2001 | Ledesma | |
| 6,212,455 B1 | 4/2001 | Weaver | |
| 6,216,066 B1 | 4/2001 | Goebel | |
| 6,222,458 B1 | 4/2001 | Harris | |
| 6,225,898 B1 | 5/2001 | Kamiya | |
| 6,227,862 B1 | 5/2001 | Harkness | |
| 6,229,438 B1 | 5/2001 | Kutlucinar | |
| 6,232,873 B1 | 5/2001 | Dilz | |
| 6,246,933 B1 | 6/2001 | Bague | |
| 6,247,360 B1 | 6/2001 | Anderson | |
| 6,249,219 B1 | 6/2001 | Perez | |
| 6,253,129 B1 | 6/2001 | Jenkins et al. | |
| 6,255,892 B1 | 7/2001 | Gartner et al. | |
| 6,255,939 B1 | 7/2001 | Roth | |
| 6,262,658 B1 | 7/2001 | O'Connor | |
| 6,265,989 B1 | 7/2001 | Taylor | |
| 6,266,588 B1 | 7/2001 | McClellan | |
| 6,278,361 B1 | 8/2001 | Magiawala | |
| 6,285,931 B1 | 9/2001 | Hattori | |
| 6,289,332 B2 | 9/2001 | Menig | |
| 6,294,988 B1 | 9/2001 | Shomura | |
| 6,294,989 B1 | 9/2001 | Schofield | |
| 6,295,492 B1 | 9/2001 | Lang | |
| 6,297,768 B1 | 10/2001 | Allen, Jr. | |
| 6,301,533 B1 | 10/2001 | Markow | |
| 6,306,063 B1 | 10/2001 | Horgan et al. | 477/108 |
| 6,308,120 B1 | 10/2001 | Good | |
| 6,308,134 B1 | 10/2001 | Croyle et al. | |
| 6,313,742 B1 | 11/2001 | Larson | |
| 6,320,497 B1 | 11/2001 | Fukumoto | |
| 6,331,825 B1 | 12/2001 | Ladner et al. | |
| 6,333,686 B1 | 12/2001 | Waltzer | |
| 6,337,653 B1 | 1/2002 | Bchler | |
| 6,339,739 B1 | 1/2002 | Folke | |
| 6,339,745 B1 | 1/2002 | Novik | 701/208 |

(56) References Cited

U.S. PATENT DOCUMENTS

| | | |
|---|---|---|
| 6,344,805 B1 | 2/2002 | Yasui |
| 6,351,211 B1 | 2/2002 | Bussard |
| 6,356,188 B1 | 3/2002 | Meyers |
| 6,356,822 B1 | 3/2002 | Diaz |
| 6,356,833 B2 | 3/2002 | Jeon |
| 6,356,836 B1 | 3/2002 | Adolph ............... 701/208 |
| 6,359,554 B1 | 3/2002 | Skibinski |
| 6,362,730 B2 | 3/2002 | Razavi |
| 6,362,734 B1 | 3/2002 | McQuade |
| 6,366,199 B1 | 4/2002 | Osborn |
| 6,378,959 B2 | 4/2002 | Lesesky |
| 6,389,340 B1 | 5/2002 | Rayner |
| 6,393,348 B1 | 5/2002 | Ziegler |
| 6,404,329 B1 | 6/2002 | Hsu |
| 6,405,112 B1 | 6/2002 | Rayner |
| 6,405,128 B1 | 6/2002 | Bechtolsheim et al. ...... 701/208 |
| 6,415,226 B1 | 7/2002 | Kozak ............... 701/210 |
| 6,424,268 B1 | 7/2002 | Isonaga |
| 6,427,687 B1 | 8/2002 | Kirk |
| 6,430,488 B1 | 8/2002 | Goldman |
| 6,433,681 B1 | 8/2002 | Foo |
| 6,441,732 B1 | 8/2002 | Laitsaari |
| 6,449,540 B1 | 9/2002 | Rayner |
| 6,459,367 B1 | 10/2002 | Green |
| 6,459,369 B1 | 10/2002 | Wang |
| 6,459,961 B1 | 10/2002 | Obradovich |
| 6,459,969 B1 | 10/2002 | Bates |
| 6,462,675 B1 | 10/2002 | Humphrey |
| 6,472,979 B2 | 10/2002 | Schofield |
| 6,476,763 B2 | 11/2002 | Allen, Jr. |
| 6,480,106 B1 | 11/2002 | Crombez |
| 6,484,035 B2 | 11/2002 | Allen, Jr. |
| 6,484,091 B2 | 11/2002 | Shibata |
| 6,493,650 B1 | 12/2002 | Rodgers |
| 6,512,969 B1 | 1/2003 | Wang |
| 6,515,596 B2 | 2/2003 | Awada |
| 6,519,512 B1 | 2/2003 | Haas |
| 6,525,672 B2 | 2/2003 | Chainer |
| 6,526,341 B1 | 2/2003 | Bird et al. |
| 6,529,159 B1 | 3/2003 | Fan et al. |
| 6,535,116 B1 | 3/2003 | Zhou |
| 6,542,074 B1 | 4/2003 | Tharman |
| 6,542,794 B2 | 4/2003 | Obradovich |
| 6,549,834 B2 | 4/2003 | McClellan |
| 6,552,682 B1 | 4/2003 | Fan |
| 6,556,905 B1 | 4/2003 | Mittelsteadt |
| 6,559,769 B2 | 5/2003 | Anthony |
| 6,564,126 B1 | 5/2003 | Lin |
| 6,567,000 B2 | 5/2003 | Slifkin |
| 6,571,168 B1 | 5/2003 | Murphy |
| 6,587,759 B2 | 7/2003 | Obradovich |
| 6,594,579 B1 | 7/2003 | Lowrey |
| 6,599,243 B2 | 7/2003 | Woltermann |
| 6,600,985 B2 | 7/2003 | Weaver |
| 6,604,033 B1 | 8/2003 | Banet |
| 6,609,063 B1 | 8/2003 | Bender et al. ............ 701/209 |
| 6,609,064 B1 | 8/2003 | Dean ............... 701/213 |
| 6,611,740 B2 | 8/2003 | Lowrey |
| 6,611,755 B1 | 8/2003 | Coffee |
| 6,622,085 B1 | 9/2003 | Amita et al. ............ 701/208 |
| 6,629,029 B1 | 9/2003 | Giles |
| 6,630,884 B1 | 10/2003 | Shanmugham |
| 6,631,322 B1 | 10/2003 | Arthur et al. ............ 701/211 |
| 6,636,790 B1 | 10/2003 | Lightner |
| 6,639,512 B1 | 10/2003 | Lee |
| 6,643,578 B2 | 11/2003 | Levine |
| 6,644,723 B2* | 11/2003 | Motozawa ............. 296/187.12 |
| 6,651,001 B2 | 11/2003 | Apsell |
| 6,654,682 B2 | 11/2003 | Kane et al. |
| 6,657,540 B2 | 12/2003 | Knapp |
| 6,662,013 B2 | 12/2003 | Takiguchi et al. |
| 6,662,141 B2 | 12/2003 | Kaub ............... 702/181 |
| 6,664,922 B1 | 12/2003 | Fan |
| 6,665,613 B2 | 12/2003 | Duvall |
| 6,674,362 B2 | 1/2004 | Yoshioka |
| 6,675,085 B2 | 1/2004 | Straub |
| 6,677,854 B2 | 1/2004 | Dix |
| 6,678,612 B1 | 1/2004 | Khawam |
| 6,690,302 B1* | 2/2004 | Inomata ............... 340/989 |
| 6,696,932 B2 | 2/2004 | Skibinski |
| 6,703,925 B2 | 3/2004 | Steffel |
| 6,710,738 B2 | 3/2004 | Allen, Jr. |
| 6,714,894 B1 | 3/2004 | Tobey et al. ............ 702/188 |
| 6,718,235 B1 | 4/2004 | Borugian |
| 6,718,239 B2 | 4/2004 | Rayner |
| 6,727,809 B1 | 4/2004 | Smith |
| 6,728,605 B2 | 4/2004 | Lash |
| 6,732,031 B1 | 5/2004 | Lightner et al. |
| 6,732,032 B1 | 5/2004 | Banet et al. |
| 6,737,962 B2 | 5/2004 | Mayor |
| 6,741,169 B2 | 5/2004 | Magiawala |
| 6,741,170 B2 | 5/2004 | Alrabady |
| 6,745,153 B2 | 6/2004 | White |
| 6,748,322 B1 | 6/2004 | Fernandez |
| 6,750,761 B1 | 6/2004 | Newman |
| 6,750,762 B1 | 6/2004 | Porter |
| 6,756,916 B2 | 6/2004 | Yanai |
| 6,759,952 B2 | 7/2004 | Dunbridge |
| 6,766,244 B2 | 7/2004 | Obata et al. ............ 701/207 |
| 6,768,448 B2 | 7/2004 | Farmer |
| 6,775,602 B2 | 8/2004 | Gordon |
| 6,778,068 B2 | 8/2004 | Wolfe |
| 6,778,885 B2 | 8/2004 | Agashe et al. |
| 6,784,793 B2 | 8/2004 | Gagnon |
| 6,784,832 B2 | 8/2004 | Knockeart et al. |
| 6,788,196 B2 | 9/2004 | Ueda |
| 6,788,207 B2 | 9/2004 | Wilkerson |
| 6,792,339 B2 | 9/2004 | Basson |
| 6,795,017 B1 | 9/2004 | Puranik et al. |
| 6,798,354 B2 | 9/2004 | Schuessler |
| 6,803,854 B1 | 10/2004 | Adams et al. |
| 6,807,481 B1 | 10/2004 | Gastelum |
| 6,813,549 B2 | 11/2004 | Good |
| 6,819,236 B2 | 11/2004 | Kawai |
| 6,832,141 B2 | 12/2004 | Skeen et al. |
| 6,845,314 B2 | 1/2005 | Fosseen |
| 6,845,316 B2 | 1/2005 | Yates ............... 701/117 |
| 6,845,317 B2 | 1/2005 | Craine |
| 6,847,871 B2 | 1/2005 | Malik et al. ............ 701/33 |
| 6,847,872 B2 | 1/2005 | Bodin |
| 6,847,873 B1 | 1/2005 | Li |
| 6,847,887 B1 | 1/2005 | Casino ............... 701/208 |
| 6,850,841 B1 | 2/2005 | Casino ............... 701/208 |
| 6,859,039 B2 | 2/2005 | Horie |
| 6,859,695 B2 | 2/2005 | Klausner |
| 6,865,457 B1 | 3/2005 | Mittelsteadt |
| 6,867,733 B2 | 3/2005 | Sandhu et al. |
| 6,868,386 B1 | 3/2005 | Henderson et al. |
| 6,870,469 B2 | 3/2005 | Ueda |
| 6,873,253 B2 | 3/2005 | Veziris |
| 6,873,261 B2 | 3/2005 | Anthony |
| 6,879,894 B1 | 4/2005 | Lightner |
| 6,885,293 B2 | 4/2005 | Okumura |
| 6,892,131 B2 | 5/2005 | Coffee |
| 6,894,606 B2 | 5/2005 | Forbes et al. ............ 340/435 |
| 6,895,332 B2 | 5/2005 | King |
| 6,909,398 B2 | 6/2005 | Knockeart et al. |
| 6,914,523 B2 | 7/2005 | Munch |
| 6,922,133 B2 | 7/2005 | Wolfe |
| 6,922,616 B2 | 7/2005 | Obradovich |
| 6,922,622 B2 | 7/2005 | Dulin |
| 6,925,425 B2 | 8/2005 | Remboski |
| 6,928,348 B1 | 8/2005 | Lightner |
| 6,937,162 B2 | 8/2005 | Tokitsu |
| 6,950,013 B2 | 9/2005 | Scaman |
| 6,954,140 B2 | 10/2005 | Holler |
| 6,957,961 B1* | 10/2005 | Owens et al. ............ 434/270 |
| 6,958,976 B2 | 10/2005 | Kikkawa |
| 6,965,827 B1 | 11/2005 | Wolfson ............... 701/207 |
| 6,968,311 B2 | 11/2005 | Knockeart et al. |
| 6,970,075 B2 | 11/2005 | Cherouny |
| 6,970,783 B2 | 11/2005 | Knockeart et al. |
| 6,972,669 B2 | 12/2005 | Saito |
| 6,980,131 B1 | 12/2005 | Taylor |

(56) References Cited

U.S. PATENT DOCUMENTS

| | | | | |
|---|---|---|---|---|
| 6,981,565 | B2 | 1/2006 | Gleacher | |
| 6,982,636 | B1 | 1/2006 | Bennie | |
| 6,983,200 | B2 | 1/2006 | Bodin | |
| 6,988,033 | B1 | 1/2006 | Lowrey | |
| 6,988,034 | B1 | 1/2006 | Marlatt et al. | 701/200 |
| 6,989,739 | B2 | 1/2006 | Li | |
| 7,002,454 | B1 | 2/2006 | Gustafson | |
| 7,002,579 | B2 | 2/2006 | Olson | |
| 7,005,975 | B2 | 2/2006 | Lehner | |
| 7,006,820 | B1 | 2/2006 | Parker et al. | |
| 7,019,641 | B1 | 3/2006 | Lakshmanan | |
| 7,023,321 | B2 | 4/2006 | Brillon et al. | |
| 7,023,332 | B2 | 4/2006 | Saito | |
| 7,024,318 | B2 | 4/2006 | Fischer | |
| 7,027,808 | B2 | 4/2006 | Wesby | |
| 7,034,705 | B2 | 4/2006 | Yoshioka | |
| 7,038,578 | B2 | 5/2006 | Will | |
| 7,039,507 | B2 | 5/2006 | Hagenbuch | |
| 7,042,347 | B2 | 5/2006 | Cherouny | |
| 7,047,114 | B1 | 5/2006 | Rogers | |
| 7,049,941 | B2 | 5/2006 | Rivera-Cintron | |
| 7,054,742 | B2 | 5/2006 | Khavakh et al. | 701/209 |
| 7,059,689 | B2 | 6/2006 | Lesesky | |
| 7,069,126 | B2 | 6/2006 | Bernard | |
| 7,069,134 | B2 | 6/2006 | Williams | |
| 7,072,753 | B2 | 7/2006 | Eberle | |
| 7,081,811 | B2 | 7/2006 | Johnston | |
| 7,084,755 | B1 | 8/2006 | Nord | |
| 7,088,225 | B2 | 8/2006 | Yoshioka | |
| 7,089,116 | B2 | 8/2006 | Smith | |
| 7,091,880 | B2 | 8/2006 | Sorensen | |
| 7,098,812 | B2 | 8/2006 | Hirota | |
| 7,099,750 | B2 | 8/2006 | Miyazawa | |
| 7,099,774 | B2 | 8/2006 | King | |
| 7,102,496 | B1 | 9/2006 | Ernst | |
| 7,109,853 | B1 | 9/2006 | Mattson | |
| 7,113,081 | B1 | 9/2006 | Reichow | |
| 7,113,107 | B2 | 9/2006 | Taylor | |
| 7,117,075 | B1 | 10/2006 | Larschan et al. | |
| 7,119,696 | B2 | 10/2006 | Borugian | |
| 7,124,027 | B1 | 10/2006 | Ernst | |
| 7,124,088 | B2 | 10/2006 | Bauer et al. | |
| 7,129,825 | B2 | 10/2006 | Weber | |
| 7,132,934 | B2 | 11/2006 | Allison | |
| 7,132,937 | B2 | 11/2006 | Lu | |
| 7,132,938 | B2 | 11/2006 | Suzuki | |
| 7,133,755 | B2 | 11/2006 | Salman | |
| 7,135,983 | B2 | 11/2006 | Filippov | |
| 7,138,916 | B2 | 11/2006 | Schwartz | |
| 7,139,661 | B2 | 11/2006 | Holze | |
| 7,145,442 | B1 | 12/2006 | Wai | |
| 7,149,206 | B2 | 12/2006 | Pruzan | |
| 7,155,321 | B2 | 12/2006 | Bromley et al. | 701/29 |
| 7,161,473 | B2 | 1/2007 | Hoshal | |
| 7,164,986 | B2 | 1/2007 | Humphries | |
| 7,170,390 | B2 | 1/2007 | Quiñones | |
| 7,170,400 | B2 | 1/2007 | Cowelchuk | |
| 7,174,243 | B1 | 2/2007 | Lightner | |
| 7,180,407 | B1 | 2/2007 | Guo | |
| 7,180,409 | B2 | 2/2007 | Brey | |
| 7,187,271 | B2 | 3/2007 | Nagata | |
| 7,196,629 | B2 | 3/2007 | Ruoss | |
| 7,197,500 | B1 | 3/2007 | Israni et al. | 707/100 |
| 7,216,022 | B2 | 5/2007 | Kynast et al. | 701/1 |
| 7,216,035 | B2 | 5/2007 | Hörtner | |
| 7,218,211 | B2 | 5/2007 | Ho et al. | |
| 7,222,009 | B2 | 5/2007 | Hijikata | |
| 7,225,065 | B1 | 5/2007 | Hunt | |
| 7,228,211 | B1 | 6/2007 | Lowrey | |
| 7,233,235 | B2 | 6/2007 | Pavlish | |
| 7,236,862 | B2 | 6/2007 | Kanno | |
| 7,239,948 | B2 | 7/2007 | Nimmo et al. | |
| 7,256,686 | B2 | 8/2007 | Koutsky | |
| 7,256,700 | B1 | 8/2007 | Ruocco | |
| 7,256,702 | B2 | 8/2007 | Isaacs | |
| 7,260,497 | B2 | 8/2007 | Watabe | |
| RE39,845 | E | 9/2007 | Hasfjord | |
| 7,269,507 | B2 | 9/2007 | Cayford | 701/208 |
| 7,269,530 | B1 | 9/2007 | Lin | |
| 7,271,716 | B2 | 9/2007 | Nou | |
| 7,273,172 | B2 | 9/2007 | Olsen | |
| 7,280,046 | B2 | 10/2007 | Berg | |
| 7,283,904 | B2 | 10/2007 | Benjamin | |
| 7,286,917 | B2 | 10/2007 | Hawkins | |
| 7,286,929 | B2 | 10/2007 | Staton | |
| 7,289,024 | B2 | 10/2007 | Sumcad | |
| 7,289,035 | B2 | 10/2007 | Nathan | |
| 7,292,152 | B2 | 11/2007 | Torkkola | |
| 7,292,159 | B2 | 11/2007 | Culpepper | |
| 7,298,248 | B2 | 11/2007 | Finley | |
| 7,298,249 | B2 | 11/2007 | Avery | |
| 7,301,445 | B2 | 11/2007 | Moughler | |
| 7,317,383 | B2 | 1/2008 | Ihara | |
| 7,317,392 | B2 | 1/2008 | DuRocher | |
| 7,317,927 | B2 | 1/2008 | Staton | |
| 7,319,848 | B2 | 1/2008 | Obradovich | |
| 7,321,294 | B2 | 1/2008 | Mizumaki | |
| 7,321,825 | B2 | 1/2008 | Ranalli | |
| 7,323,972 | B2 | 1/2008 | Nobusawa | |
| 7,323,974 | B2 | 1/2008 | Schmid | |
| 7,323,982 | B2 | 1/2008 | Staton | |
| 7,327,239 | B2 | 2/2008 | Gallant | |
| 7,327,258 | B2 | 2/2008 | Fast | |
| 7,333,883 | B2 | 2/2008 | Geborek | |
| 7,339,460 | B2 | 3/2008 | Lane | |
| 7,349,782 | B2 | 3/2008 | Churchill | |
| 7,352,081 | B2 | 4/2008 | Taurasi | |
| 7,355,508 | B2 | 4/2008 | Mian | |
| 7,365,639 | B2 | 4/2008 | Yuhara | |
| 7,366,551 | B1 | 4/2008 | Hartley | |
| 7,375,624 | B2 | 5/2008 | Hines | |
| 7,376,499 | B2 | 5/2008 | Salman | |
| 7,378,946 | B2 | 5/2008 | Lahr | |
| 7,378,949 | B2 | 5/2008 | Chen | |
| 7,386,394 | B2 | 6/2008 | Shulman | |
| 7,421,334 | B2 | 9/2008 | Dahlgren et al. | 701/117 |
| 7,433,889 | B1 | 10/2008 | Barton | 707/104.1 |
| 7,447,509 | B2 | 11/2008 | Cossins et al. | 455/457 |
| 7,471,998 | B2* | 12/2008 | Peravali et al. | 701/33.4 |
| 7,499,949 | B2 | 3/2009 | Barton | 707/104.1 |
| 7,527,288 | B2* | 5/2009 | Breed | 280/735 |
| 7,565,230 | B2 | 7/2009 | Gardner et al. | 701/35 |
| 7,880,642 | B2 | 2/2011 | Gueziec | 340/905 |
| 7,898,388 | B2 | 3/2011 | Ehrman et al. | 340/5.8 |
| 7,941,258 | B1 | 5/2011 | Mittelsteadt et al. | 701/35 |
| 2001/0018628 | A1 | 8/2001 | Jenkins et al. | 701/35 |
| 2002/0024444 | A1 | 2/2002 | Hiyama et al. | 340/576 |
| 2002/0103622 | A1* | 8/2002 | Burge | 702/183 |
| 2002/0111725 | A1 | 8/2002 | Burge | 701/29 |
| 2003/0050830 | A1* | 3/2003 | Troyer | 705/11 |
| 2003/0055555 | A1 | 3/2003 | Knockeart et al. | |
| 2003/0125846 | A1* | 7/2003 | Yu et al. | 701/1 |
| 2003/0176958 | A1* | 9/2003 | Hagenbuch | 701/29 |
| 2004/0039504 | A1 | 2/2004 | Coffee et al. | |
| 2004/0066330 | A1 | 4/2004 | Knockeart et al. | |
| 2004/0077339 | A1 | 4/2004 | Martens | |
| 2004/0083041 | A1 | 4/2004 | Skeen et al. | |
| 2004/0142672 | A1 | 7/2004 | Stankewitz | |
| 2004/0210353 | A1 | 10/2004 | Rice | 701/1 |
| 2004/0236474 | A1 | 11/2004 | Chowdhary et al. | 701/1 |
| 2005/0038580 | A1 | 2/2005 | Seim et al. | 701/29 |
| 2005/0064835 | A1 | 3/2005 | Gusler | |
| 2005/0091018 | A1 | 4/2005 | Craft | |
| 2005/0096809 | A1 | 5/2005 | Skeen et al. | |
| 2005/0108065 | A1* | 5/2005 | Dorfstatter | 705/4 |
| 2005/0125127 | A1* | 6/2005 | Bomar et al. | 701/45 |
| 2005/0137757 | A1 | 6/2005 | Phelan et al. | |
| 2005/0246079 | A1* | 11/2005 | Maesono et al. | 701/35 |
| 2006/0154687 | A1 | 7/2006 | McDowell | |
| 2006/0234711 | A1 | 10/2006 | McArdle | |
| 2007/0061155 | A1* | 3/2007 | Ji et al. | 705/1 |
| 2007/0229234 | A1 | 10/2007 | Smith | |
| 2007/0293206 | A1 | 12/2007 | Lund | |
| 2008/0064413 | A1 | 3/2008 | Breed | |

(56) References Cited

U.S. PATENT DOCUMENTS

| | | | |
|---|---|---|---|
| 2008/0167775 A1* | 7/2008 | Kuttenberger et al. | 701/36 |
| 2008/0255888 A1 | 10/2008 | Berkobin | |
| 2009/0119132 A1* | 5/2009 | Bolano et al. | 705/4 |

FOREIGN PATENT DOCUMENTS

| | | | |
|---|---|---|---|
| EP | 1 548 653 A2 | 6/2005 | G07C 5/08 |
| WO | WO2005109369 | 11/2005 | |
| WO | WO2008109477 | 9/2008 | |

OTHER PUBLICATIONS

"(R) Instrumentation for Impact Test--Part 1--Electric Instrumentation," Surface Vehicle Recommended Practice, SAE International ®The Engineering Society for Advancing Mobility Land Sea Air and Space, J211-1, Rev. Mar. 2005, Warrendale, PA, pp. 1-21.

"(R) Instrumentation for Impact Test--Part 2--Photographic Instrumentation," Surface Vehicle Recommended Practice, SAE International ® The Engineering Society for Advancing Mobility Land Sea Air and Space® International, J211/2, Rev. Mar. 2005, Warrendale, PA, pp. 1-6.

European Patent Office; Extended European Search Report for Application No. 08768162.3-2201 / 2174245 PCT/US2008007085; 9 pages, Jun. 8, 2011.

European Patent Office; Communication Pursuant to Article 94(3) EPC for Application No. 08 768 162.3-2201; 9 pages, Feb. 27, 2012.

Ogle, et al.; *Accuracy of Global Positioning System for Determining Driver Performance Parameters*; Transportation Research Record 1818; Paper No. 02-1063; pp. 12-24, Date Unknown.

Shen, et al.; *A computer Assistant for Vehicle Dispatching with Learning Capabilities*; Annals of Operations Research 61; pp. 189-211, 1995.

Tijerina, et al.; *Final Report Supplement; Heavy Vehicle Driver Workload Assessment; Task 5: Workload Assessment Protocol*; U.S. Department of Transportation; 69 pages, Oct. 1996.

Myra Blanco; *Effects of In-Vehicle Information System (IVIS) Tasks on the Information Processing Demands of a Commercial Vehicle Operations (CVO) Driver*; 230 pages, 1999.

European Patent Office; Summons to Attend Oral Proceedings Pursuant to Rule 115(1) EPC for Application No. 08768162.3-2201 / 2174245; 11 pages, Aug. 24, 2012.

\* cited by examiner

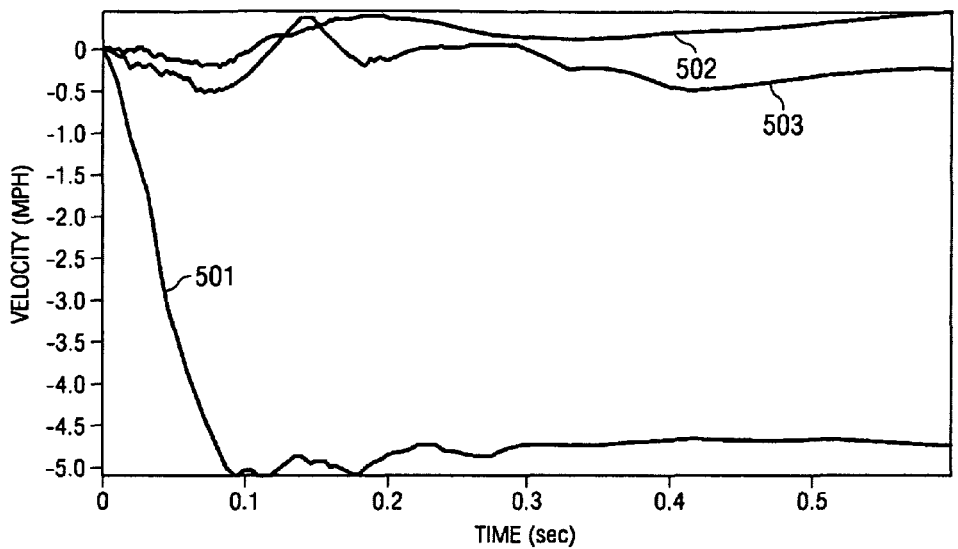

SYSTEM AND METHOD FOR THE COLLECTION, CORRELATION AND USE OF VEHICLE COLLISION DATA

TECHNICAL FIELD

The present invention relates generally to a system and method for monitoring vehicles and, more particularly, to a system and method for using collision data to estimate passenger injuries and property damage resulting from a vehicle collision.

BACKGROUND

Currently, when a vehicle is in a collision, crash, or other impact in which the vehicle may be damaged and the occupants may be injured, there is no system available for providing emergency response personnel a detailed, event-specific estimate of the passengers injuries before they arrive on the accident scene. Instead, emergency response personnel may receive only limited information, such as notice that the vehicle was in a head-on collision, was involved in a roll-over accident, or that there was air-bag deployment. From this limited information, based upon their experience and/or training, the emergency response personnel can estimate generally what injuries might be expected and can estimate generally what type of response to the accident scene. Additionally, non-medical emergency response personnel who arrive on the accident scene may provide limited information based upon their observations, such as whether a passenger is bleeding, has obvious broken bones, or is unconscious. However, until emergency response personnel with medical training arrive at the accident scene, they will only have a general or vague expectation of what type of injuries may need to be treated.

Insurance companies that insure the vehicles involved in collisions typically are not notified that one of their insured vehicles was involved in a crash until a claim is filed by the insured or another party. Even if the insurance company was alerted to the accident, it would not know what type of injuries might be expected from the collision or what type of property damage claims may be filed. It is not until the injured passengers or others file a claim that the insurance company will know the scope of its potential liability for personal injuries arising from the accident. Similarly, until an insurance company claims adjuster inspects the vehicle and property damage, the insurer will not know the extent of property damage claims that may result from the accident.

SUMMARY OF THE INVENTION

The present invention provides real-time notice to emergency response and medical personnel and to insurance companies when an accident occurs that might involve injuries to vehicle occupants or damage to the vehicle. In addition to providing notice of the occurrence of the accident, the present invention also provides information regarding the probable injuries sustained by the vehicle occupants, if any such injuries are likely. The amount of damage to the vehicle and injury information is also provided to the vehicle's insurer. As a result, emergency response and medical personnel have a more detailed estimate of the injuries that they will likely need to treat before they arrive on the scene. This allows the emergency response personnel and hospital emergency personnel to be properly prepared for the accident to which they are responding. Dispatch personnel can also use the injury and property damage estimates to dispatch the proper response, such as paramedics, ambulances, or a Life Flight helicopter, depending on the likely severity of the injuries.

In one embodiment of the invention, a system and method for collecting vehicle data receives crash data from a plurality of vehicle monitoring devices and adds the crash data to a database. The crash data is associated with a single or multiple vehicle crash, collision, or accident impact. The database is updated with additional information gathered from specific crashes. The crash data is then correlated based upon a vehicle type parameter. Crash data parameters associated with one or more injury severity thresholds are identified. Alternatively, crash data parameters associated with one or more vehicle damage severity thresholds are identified.

The crash data may be correlated based upon one or more occupant parameters. The crash data parameters associated with one or more injury severity thresholds may be identified for correlation to future crashes. Occupant parameters comprise parameters, such as an occupant's age, weight, height, sex, position in the vehicle, use of seat belts, and medical history, may be used to correlate the crash data. The crash data may comprise a change of velocity (delta V), a rate of change of a velocity (delta V slope), an acceleration, Jerk (the rate of change of acceleration), crash pulse duration observed during the crash, peak acceleration, peak Delta V, and orientation among other things. The crash data may indicate seat belt use or airbag deployment during the crash.

After data for a particular crash is added to the database, that data can be updated with additional information specific to that crash. The additional data may comprise occupant injury data, medical treatment, medical costs, diagnosis, prognosis, recovery, recovery time, whole body impairment (if applicable), vehicle damage, vehicle repair cost.

The crash database may be used by a system and method for responding to vehicle crash notification messages or signals. When a crash notification is received from a vehicle monitoring device, a crash database can be queried using one or more of the crash parameters. An injury estimate is obtained from the database for one or more vehicle occupants based upon the one or more crash parameters. The injury estimate is then provided to emergency response personnel. The emergency response personnel can also be alerted to a potential injury location. The injury estimate may comprise a predicted injury severity or one or more predicted injury types. The injury estimate may be based upon a vehicle occupant's position in the vehicle, the occupant's use of seat belts, an airbag deployment, crash severity (Delta V) magnitude and direction, among other measured parameters.

In addition to notifying emergency response personnel, such as paramedics, an ambulance crew, or emergency room personnel, of the injuries, a vehicle owner or insurance company may be notified of the crash. A vehicle damage estimate may also be received from the crash database based upon the crash parameters. The vehicle damage estimate may be provided to an insurance company, emergency response personnel, or a vehicle owner.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates velocity data collected by a vehicle monitoring system according to embodiments of the invention; and FIG. 6 is a table illustrating injury or damage probability for various impact ranges according to embodiments of the invention.

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Figure 1:
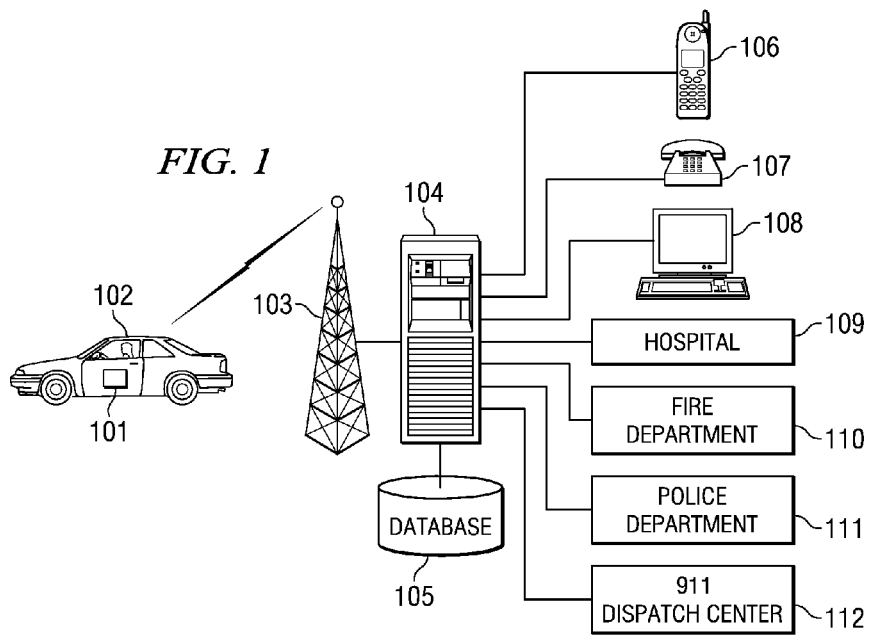
FIG. 1 is a block diagram of a system incorporating embodiments of the present invention.

With reference now to FIG. 1, there is shown a block diagram of a system incorporating one embodiment of the invention. Vehicle 102 has a vehicle monitoring system 101. Vehicle 102 may be any type of government, commercial or privately owned vehicle. Monitoring system 101 is configured to collect vehicle data, such as operating parameters and location information. As described herein, monitoring system 101 may receive information from a GPS receiver, from accelerometers, from a crash data recorder (CDR), and/or from the on-board diagnostic systems of vehicle 102. Such as the vehicle monitoring system described in U.S. patent application Ser. No. 11/805,237, filed on May 22, 2007, entitled "System and Method for Monitoring Vehicle Parameters and Driver Behavior," which application is hereby incorporated by reference herein. In particular, monitoring system 101 is configured to monitor acceleration forces on vehicle 102 and changes in the velocity of vehicle 102.

Monitoring system 101 is in wireless communication with central monitoring server 104 via communication network 103. The wireless communication 103 may be via an any private or public communication network or technology without limitation, including, for example, cellular network, satellite, WiFi, Bluetooth, infrared, ultrasound, short wave, microwave or any other suitable method. Preferably, the communication connection or link between monitoring system 101 and server 104 is two-way communication that allows each entity to send information to the other. The communication link may be a continuous connection or it may be an intermittent connection that occurs either at regular intervals or when either the monitoring system 101 or server 104 has data or reports to be sent.

Server 104 is coupled to database 105, which holds information associated with vehicle 102, monitoring system 101, the owner, driver and/or occupants of vehicle 102, and other data relevant to the vehicle monitoring system. Database 105 and server 104 may be separate devices, or they may be incorporated into one device. Server 104 may be any processor-based device capable of running software applications for processing information received from monitoring system 101 and for exchanging data with database 105. Server 104 is also capable of communicating with system 101 and other devices, such as wireless device 106, telephone 107, computer data terminal or personal computer 108, hospital 109, fire department 110, police department 111, or emergency response and dispatch center 112.

In the present invention, monitoring system 101 detects when vehicle 102 is involved in an accident, crash or collision and provides automatic crash notification. When vehicle 102 is involved in a collision or other impact, the accelerometers in monitoring system 101 detects and measure the change in vehicle velocity, the "g" forces, the amount of force involved, and/or other parameters. If these parameters exceed a preset threshold, monitoring system 101 recognizes or labels the event as a collision. Monitoring system 101 measures and records various parameters associated with the collision impact, such as change in vehicle velocity (Delta V), the rate of the change in vehicle velocity (Delta V slope), maximum acceleration in the x-, y- and z-axis (Peak G), the duration of the impact pulse.

Monitoring system 101 may also determine and record occupant information, such as, for example, the height, weight, age, and sex of the occupants. Additional occupant information, such as their driver's license number, insurance information, medical history information (e.g. allergies, prior surgeries, primary doctor, emergency notification information, and donor information) may also be determined by the monitoring system. The personal and medical information for the driver and occupants may be available from database 105, or from other sources. For example, medical and personal data may be carried on a variety of media, such a USB flash memory device, RFID tag, or Secure Digital (SD), multimedia, Compact Flash (CF) or other flash memory card. A memory card or device may be plugged into vehicle monitoring system 101 which would then download the relevant personal and medical information for the vehicle driver or occupants. In another embodiment, an RFID tag, which may be, for example, attached to a drivers license, is energized by an RFID antenna for monitoring device 101 and medical and personal information may then be read from the RFID tag. Using the medical and personal information captured from a memory device or RFID tag, monitoring system 101 then sends medical information to the appropriate entities if the vehicle is in a collision of significance or if a crash notification is sent. The medical information may be sent along with specifics of the crash severity to alert medical personnel to the potential injuries suffered by the vehicle occupants.

A threshold is set, for example, in the accelerometers for monitoring system 101 so that when the threshold is exceeded, the monitoring system determines that a crash has occurred. The threshold may be set, for example, as a maximum acceleration or deceleration in a particular direction or in any direction. Every time a vehicle is involved in a crash, vehicle monitoring system 101 sends the crash data to central server 104. The crash data may include, for example, acceleration data recorded during the crash, speed of the vehicle at the time of crash, or other parameters recorded during a period immediately before to immediately after the crash.

Crash information for multiple crashes may be collected in a database over time. The database is organized so that the crash data for particular types of vehicles, occupants, and/or driving conditions can be correlated and analyzed. This data is stored in a crash database by the central server. Table 1 illustrates the type of information that may be sent to a crash database server in one embodiment. All or some of these parameters may be sent to server 104 upon detection of a crash, collision or other impact.

TABLE 1

| |
|---|
| VEHICLE IDENTIFICATION |
| TIME |
| LOCATION |
| X-AXIS ACCELERATION |
| Y-AXIS ACCELERATION |
| Z-AXIS ACCELERATION |
| VELOCITY BEFORE CRASH |

TABLE 1-continued

VELOCITY AFTER CRASH
VELOCITY CHANGE (DELTA V)
RATE OF CHANGE OF VELOCITY (DELTA V SLOPE)
SEAT BELT USE
AIRBAG DEPLOYMENT
DRIVER/OCCUPANT IDENTIFICATION
ON-BOARD VEHICLE DIAGNOSTIC DATA

Monitoring system 101 can identify the time and location of the crash using, for example, GPS data. The on-board accelerometers in monitoring device record the accelerations (or decelerations) at the time of the crash. Monitoring system 101 can also use speedometer, GPS or other data to determine the speed or velocity (i.e. speed with a directional vector) before and after the crash. In some embodiments, the monitoring system will know the driver and/or occupants identity, such as when the monitoring system is also monitoring driver behavior or monitoring driver hours of service. The monitoring system may also capture data from the vehicle's on-board diagnostic (OBD) system or CAN bus, such as whether the engine is operating or if any engine warnings have been triggered in the crash, if the occupants were using seatbelts, if the airbags were deployed, or other information. The data shown in Table 1 or any other vehicle or occupant information collected by the monitoring system may be forwarded to server 104 upon detection of a crash. The information may be used to alert emergency response personnel and/or stored to a crash information database.

Additional data that may not be readily available to or from the vehicle monitoring system can later be added to the crash database. For example, data regarding the type of injuries sustained by the vehicle's occupants or the damage to the vehicle itself is not readily available from the vehicle monitoring system, but could be evaluated added after the crash. For example, reports of medical personnel who have treated the occupants or reports by insurance adjusters who have inspected the vehicle could be used to provide additional crash data for a particular incident. The crash data that is collected over time for a particular vehicle type can be used to create a model of the likely occupant injury and/or vehicle damage that would occur in future crashes. Table 2 illustrates the type of information that may be added to the crash database after inspection of the vehicle or treatment of the occupants.

TABLE 2

DRIVER INJURY SEVERITY
DRIVER INJURY TYPE
PASSENGER INJURY SEVERITY
PASSENGER INJURY TYPE
MEDICAL TREATMENT COST
VEHICLE DAMAGE SEVERITY
VEHICLE DAMAGE TYPE
VEHICLE REPAIR COST
SECONDARY VEHICLE DAMAGE
THIRD PARTY DAMAGE
FAULT EVALUATION

The driver and/or passenger's injuries can be evaluated and added to the crash database entry for the related collision. The severity of the injuries can be categorized, for example, as moderate, severe or fatal. The specific injury types, such as contusions, broken bones, head injury, neck injury or the like, may also be entered. Once the occupants have been treated, it is possible to add more detailed information, such as the cost of treatment. The severity, type and costs of vehicle damage may also be associated with a specific crash in the database.

The data may also include information regarding secondary damage to the vehicle, such as damage that occurs after the initial crash. For example, after an initial crash the vehicle may be damaged by fire. Additionally, the vehicle involved in the crash may cause damage to other vehicles and property, such as other vehicles involved in a collision or buildings, guardrails, fences, street signs or the like. Other data, such as fault evaluation, may also be added to the crash database. For example, a police report or an insurance adjuster's report may determine that the driver of a particular vehicle was or was not at fault for the collision or was partially at fault.

Multiple collisions may occur in one series of events. For example, a vehicle stopped at stop light may experience a rear-end collision with a second vehicle that was approaching the stop light. The rear-end collision may cause the first vehicle to have a front-end collision with a third vehicle that it was stopped behind. The crash database may treat these as separate collisions with different sets of velocity, acceleration and crash data. The database may be configured to link such related crashes together for further analysis.

The crash information database described herein includes entries associated with multiple crashes for multiple vehicles. Preferably, each entry includes crash data, such as the accelerations involved in the crash, medical information, such as injuries sustained in the crash, and vehicle damage data. This information may be correlated in many ways for further analysis. For example, all crashes involving a particular model or class of vehicle can be compared.

Figure 2:
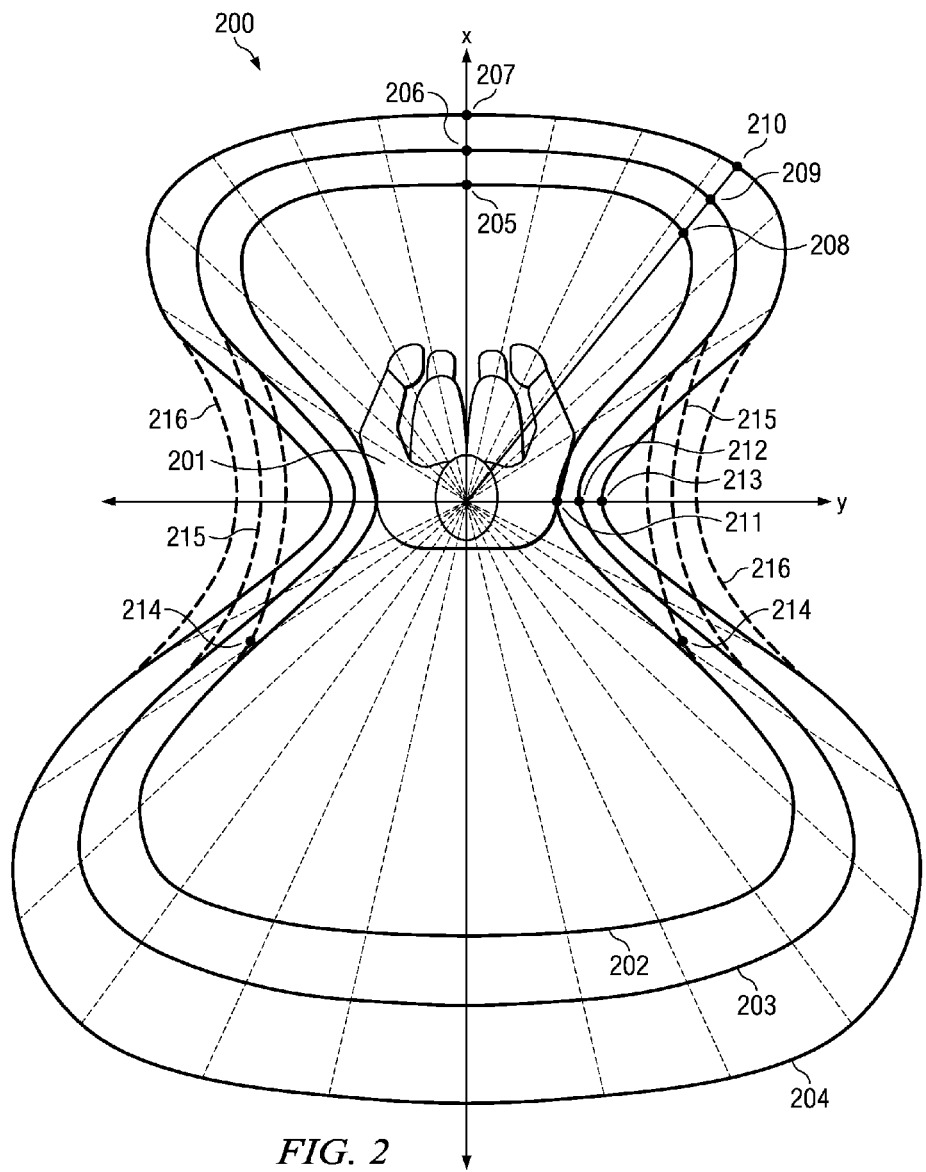
FIG. 2 illustrates injury and/or damage severity thresholds according to embodiments of the invention.

Referring to FIG. 2, crash data model 200 is illustrated for vehicle occupant 201. The data in model 200 may be associated to a specific vehicle make, model and year, or it may be associated with a broad vehicle class, such as a compact car, full-size sedan, minivan, or pickup truck. The specificity of the model is selectable based upon the amount of historical crash or impact data that is available and the user's requirements. Model 200 illustrates three curves illustrating the point at which moderate (202), severe (203), or fatal (204) injury is likely to occur to occupant 201 in a particular crash scenario. For example, if occupant 201's vehicle is involved in a head-on crash, then the monitoring system will record the parameters of the crash, such as the vehicle's speed and accelerations at impact, and send the data to the central server to be stored in a crash database. Later, after occupant 201 has been treated or observed by medical personnel, additional information, such as the degree and type of injuries or vehicle property damage, can be added to the database.

Over a period of time, after a number of head-on crashes for a particular vehicle type, average data points 205-207 can be determined for crash model 200. For example, model 200 may represent a particular vehicle traveling at a certain speed at the time of impact. Curves 202-204 represent different impact parameters that occur following the crash. The impact parameter may be an acceleration, delta V, delta V slope, or other parameter relevant to predicting injury or damage. The greater the delta V or deceleration, for example, the more likely it will be that occupant 201 will be injured. Crash data is collected for that vehicle and speed and is correlated with the injuries to occupant 201. In one embodiment, point 205 on moderate injury curve 202 represents the delta V or delta V slope at which occupants are likely to be moderately injured in head-on collisions for this type of vehicle. At delta V or delta V slopes below the amount plotted at point 205, the occupant is likely to incur little or no injury. At delta V or delta V slope greater than point 205, but less than 206, occupant 201 is likely to be moderately injured. Point 206 on severe injury curve 203 is the point beyond which a severe injury is likely to occur, and point 207 on fatal curve 204 is the point beyond which fatal injuries are likely to occur for head-on collisions for that vehicle at that speed. The curves outlined in FIG. 2 may represent Delta V (direction and magnitude), Energy (direction and magnitude), Acceleration (direction and magnitude), Jerk (direction and magnitude), displacement (direction and magnitude), crush intrusion (placement and magnitude) among other collision measurable elements. Additionally, time and/or pulse duration can have a marked effect on the injury outcome and injury severity. A different set of curves could be established for impacts of different pulse durations.

Similarly, points 208-210 may represent delta V or delta V slopes for collisions that occur at approximately 45 degrees to the right of the vehicle's centerline, and points 211-213 represent delta V or delta V slopes for collisions that occur in a side impact. As illustrated by points 211-213 in FIG. 2, side impacts are likely to cause moderate, severe, or fatal injuries at a lower delta V or delta V slope compared to head-on or forward-quarter impacts.

As the information is collected for multiple crashes, model 200 may be modified or may evolve. For example, points 211-213 may represent the delta V or delta V slope predicted for moderate, severe and fatal crashes in a side-impact collision. However, after collecting actual impact data, curves 214-216 may be identified as more accurately reflecting the injury curves for side-impact collisions.

Alternatively, model 200 may illustrate different vehicle configurations or speeds at the time of impact. For example, points 211-213 may represent points on the injury curves for a vehicle without side-impact airbags and, when side-impact airbags are deployed, the injury curves are shown by 214-216.

Moreover, the injury curves illustrated in model 200 may be as specific or as general as the available pool of data. The curves may represent a generic occupant 201 in which injury data for all crashes in a particular vehicle are used to create model 200, without regard to the occupant's individual characteristics. In another embodiment, model 200 may be specific to a particular type of occupant defined by age, sex, weight, height, existing medical conditions, occupation, driving experience or any combination of these or other parameters. Alternatively, model 200 may represent injury data for a particular time of day, roadway, intersection, city, county, state, region of the country, road conditions, weather conditions, or any combination of these or other parameters.

Figure 3:
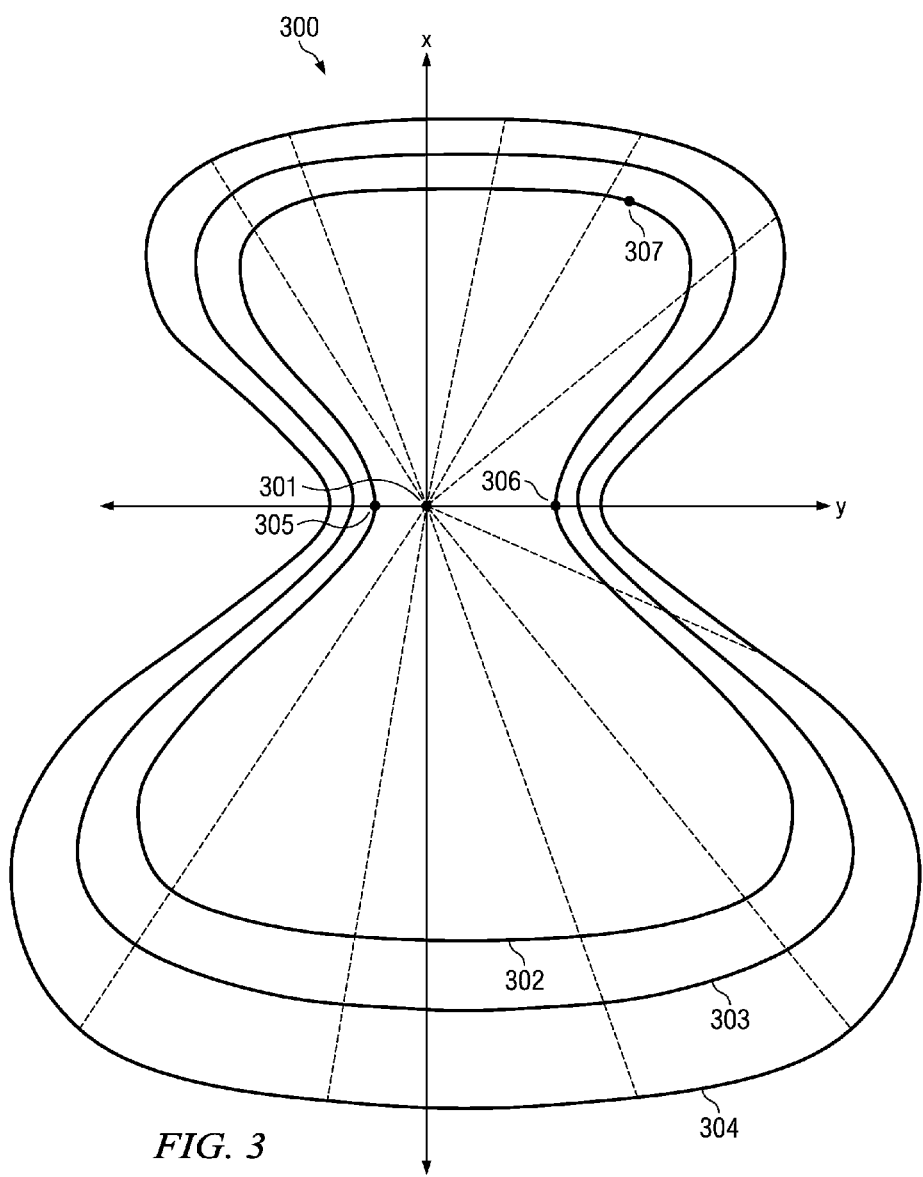
FIG. 3 illustrates alternative injury and/or damage severity thresholds according to embodiments of the invention.

FIG. 3 illustrates collision injury and crash damage model 300 in which the injury and damage curves 302-304 are drawn around origin 301. The distance from origin 301 to curves 302-304 represents an impact parameter for a moderate, severe, or fatal injury, respectively, for a particular vehicle. It is understood that the shape of the curves will be established according to empirical results (collected data). FIG. 3 might be representative of a center positioned driver with equal protection and/or exposure to the left and right sides of the vehicle. If the driver were positioned to either the right or left, FIG. 3 would likely look different due to a heightened exposure and/or less protection due to a diminished crush zone. The impact parameter may be an acceleration, delta V, delta V slope, or other parameter relevant to predicting injury or damage. Origin 301 may be the location of the driver or a vehicle passenger. Unlike model 200, the injury curves in model 300 are not symmetrical around the origin. Model 200 illustrates a vehicle in which the occupant is injured to the same degree by same-acceleration collisions on either side of the vehicle. Model 300 may represent, for example, an occupant in a driver's seat of a typical vehicle in North America. Because a driver typically sits in the front, left seat in North America, side-impact collisions will have different effects depending upon which side the collisions occurs on. For vehicles with a left-side driver, left-side impacts 305 are more likely to cause moderate injury at a lower speed or acceleration when compared to right-side impacts 306. An impact at 45 degrees to the right of the vehicle centerline 307 may require more delta V, delta V slope, or acceleration to cause a moderate injury compared to similar collisions (208-210) in vehicle represented by model 200.

Additional models may be created to represent crash data for occupants in other positions in a vehicle, such as a front-seat or rear-seat passenger. Once the vehicle crash data is captured and sent to the central database, injury data for the driver and all passengers can be associated with the crash data. The information in the database can then be sorted by vehicle and passenger location, as well as other parameters including age, sex, medical condition, etc., to create models such as 200 and 300.

Models 200 and 300 are not limited to representing injury data. Once the crash data is collected for the vehicle, other information in addition to occupant injury data may also be associated with the crash data. For example, after the vehicle has been inspected or repaired, property damage information may be added to the database. This information may include, for example, a repair amount, a description of damages, the length of the repair time, an impact on the value of the vehicle, or other information associated with the damage incurred by the vehicle during a crash. In the case of a vehicle damage model, the data can be sorted with varying levels of specificity so that the damage model may represent a specific make, model and year of a vehicle or a general class of vehicles.

Furthermore, although models 200 and 300 are shown in two dimensions in FIGS. 2 and 3, the data may be collected in three dimensions. For example, a crash data recorder (CDR) typically will record impact data in three dimensions. That data would be provided to a crash database allowing a model having an additional "z-axis" extending into and out of the page in FIGS. 2 and 3. This "z-axis" data represents accelerations in the vertical dimension relative to the vehicle. This data would be associated with events such as passing over a hill or rise in the road too fast thereby causing a negative "g" or floating feeling to the driver. In some situations, this may be indicative of poor driving behavior, but is unlikely to cause damage to a vehicle. On the other hand, accelerations in the z-axis would be caused by impacts with the road, which might be caused, for example, by driving over potholes in the road, driving over poor road surfaces, or driving off of a roadway. Impacts in the "g" direction may cause injury to the vehicle occupants or may cause property damage to the vehicle and, therefore, may be useful in the injury/damage models. FIGS. 2 and 3 use the standard SAE axis orientation, in which the forward direction is the positive x-axis, the right direction is the positive y-axis, and following the right-hand-rule the positive z-axis is down.

The crash database and crash models, such as models 200 and 300, can provide useful information to emergency response personnel, insurance companies, vehicle manufacturers and others. When a crash occurs, the vehicle monitoring system will collect the crash data, such as acceleration data from the CDR, and will send that data to a central server or crash database, such as server 104 or database 105 (FIG. 1). The information is collected and added to the crash database as described above; however, receipt of crash data may trigger other events by the central server 104. For example, upon receipt of a crash indication, the server may send a notification to emergency response personnel 109-112, such as ambulance, police and/or fire personnel. Using the data provided by the vehicle, the server can provide location information for the crash, which may deploy emergency response personnel to the crash site before an emergency or 911 call is received from the crash site or vehicle. By improving the emergency response time, the present invention may minimize injuries and provide faster treatment to the vehicle occupants.

The present invention also can provide emergency response personnel with specific information regarding the crash. For example, depending upon the type of information received from the vehicle monitoring system, the server may be able to notify the emergency response personnel as to the number of occupants, and the type and severity of the crash, as well as the type and model of the vehicle involved. The data may potentially identify weaknesses in vehicle design and thereby allows for alerting of responding emergency personnel to these vehicle weaknesses or limitations. Moreover, using the crash models and crash information database for the particular vehicle type, the server may notify the emergency response personnel as to the severity and type of injuries should be expected for the particular type of crash. The expected-injury information may also be provided to the hospital likely to receive the injured occupants for treatment. Using historical crash data, the present invention notifies medical and emergency response personnel of the type and severity of injuries that are expected in the crash. As a result, upon arrival at the crash site, the emergency response personnel will be better prepared to treat the injured occupants.

Vehicle damage estimates that are based upon the historical crash data may also be provided to emergency response personnel, such as responding police officers. For example, based upon the crash parameters, the crash database server can estimate the degree of damage to the vehicle. If the vehicle is likely to be totaled or immobilized, then a tow truck, wrecker, or auto repair service can be dispatched to the accident site before the emergency personnel arrive and evaluate the vehicle. This provides improved removal of vehicles from crash sites, which improves traffic flow at that location.

In addition to notifying emergency response personnel, the present invention may notify, for example, a vehicle owner, insurance company representative, or claims adjuster by a telephone call or email message via device 106-108. The crash data and/or the estimated injury and vehicle damage information may be sent to the insurance company. This would notify the insurance company that a claim may arise from the crash. The notification would also allow the insurance company to schedule an adjuster to inspect the vehicle for damage and to determine if there are any injuries involved with the crash. Moreover, using historical crash data and the crash model described above, the insurance company can estimate a likely range of property damage and injuries resulting from the collision.

For example, upon receiving crash data from a vehicle, the crash database server notifies emergency response personnel of the location of the collision. The server also provides expected injury and vehicle damage information to the emergency response personnel. The server sends a notification to the vehicle's insurer, notifying it that the vehicle has been in a crash. The server may provide the insurer with estimated types/severity of injuries and property damage involved in crashes of this type. The insurer can schedule an adjuster to inspect the vehicle and to determine if there will be any property damage or injury claims. This allows the insurance company to more quickly and efficiently track and evaluate claims. The insurance company may set parameters that limit the type of notifications it receives from the crash database. For example, the insurance company may only want to receive notification when the expected vehicle damage is above a predetermined amount or when there are likely to be injuries to the vehicle's occupants. For crashes expected to involve minor damage or injury, the insurance company may choose to allows the vehicle's owner to initiate a claim instead of automatically begin the claim process.

FIGS. 2 and 3 illustrate crash, collision and impact data as a series of curves in which the curves are thresholds associated with different levels of injury or damage severity. It will be understood that the data can be stored in any number of formats in server 104 or database 105. For example, in one embodiment, the crash information for a particular vehicle type may be correlated into a record having one or more of the fields such as those illustrated in Table 3.

TABLE 3

| IMPACT ANGLE |
| --- |
| DELTA V |
| DELTA V SLOPE |
| X-, Y-, AND Z-AXIS ACCELERATION |
| IMPACT PULSE DURATION |
| SEAT BELT USE |
| AIRBAG DEPLOYMENT |
| HISTORICAL OCCUPANT INJURY SEVERITY |
| HISTORICAL OCCUPANT INJURY TYPES |
| HISTORICAL VEHICLE DAMAGE SEVERITY |
| HISTORICAL VEHICLE DAMAGE TYPE |

After building a database having records such as Table 3 for a particular vehicle, the information can be used to estimate injuries and damage for subsequent collisions. For example, when server 104 receives a crash notification from a vehicle, it can then query database 105 using the vehicle type, impact angle, delta V or other impact parameters. In reply, database 105 can access the crash database records for that type of vehicle and, using the impact angle and other parameters, retrieve historical observations of occupant injuries and vehicle damage. This information is based upon similar collisions for this vehicle type and can then be provided to emergency dispatch personnel and to the hospital emergency room so that the responding medical teams will have a more accurate expectation of the type of injuries before arriving on the scene or observing injured occupants.

If the crash database does not have specific historical information for a crash notification, server 104 or database 105 may interpolate or extrapolate from known historical data to provide an estimate of the likely injuries or damage. Alternatively, server 104 and database 105 may provide information for the closest crash data available.

Figure 4:
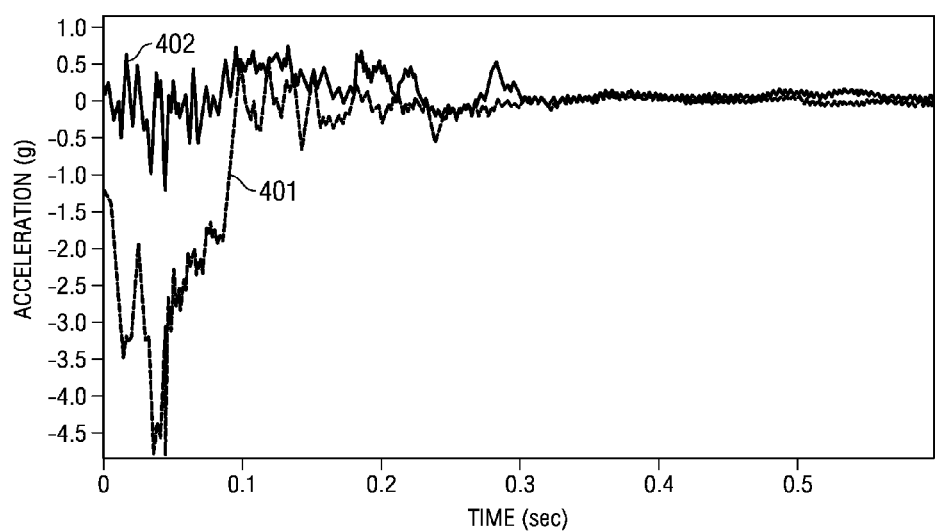
FIG. 4 illustrates acceleration data collected by a vehicle monitoring system according to embodiments of the invention.

FIG. 4 is a graph illustrating the acceleration forces that may be recorded by a vehicle monitoring system during a collision. Curve 401 represents the forward direction acceleration experienced in the vehicle following the impact (corresponding to the x-axis of FIGS. 2 and 3). Curve 402 represents the lateral acceleration experienced in the vehicle in the period following the impact, where the positive direction is to the right side of the vehicle (corresponding to the y-axis of FIGS. 2 and 3).

FIG. 5 is a graph illustrating the velocity data that may be recorded by the vehicle monitoring system during a collision. Curve 501 represents the change in velocity in the forward direction experienced in the vehicle following the impact (corresponding to the x-axis of FIGS. 2 and 3). Curve 502 represents the lateral velocities experienced by the vehicle following the impact, where the positive direction is to the right side of the vehicle (corresponding to the y-axis of FIGS. 2 and 3). Curve 503 represents the vertical velocities of the vehicle, where the positive direction is down (corresponding to the z-axis of FIGS. 2 and 3).

As illustrated in FIGS. 4 and 5, the impact velocities and accelerations observed and recorded by the vehicle monitoring system may occur in a very short period of time. For example, the significant accelerations in the illustrated collision were substantially completed within 0.1 seconds and almost completely damped out by 0.3 seconds. Accordingly, the vehicle monitoring system may record the collision data at short time intervals, such as one-hundredth of a second or smaller intervals in order to collect data points that accurately reflect the accelerations and velocities following the collision. Using the appropriate data collection interval, a more detailed and accurate analysis of the collision data may be made. The acceleration and velocity data points may be sent to a central server for further processing and analysis and for evaluation of the potential injuries and damage incurred in the accident.

FIG. 6 is table 600 listing impact data points that may be used for predicting injury to a vehicle occupant for one embodiment of the invention. Column 601 represents the probability of injury to the occupant for the various Delta V values during the impact shown in column 602. Instead of listing a probability of injury, column 601 may list an injury severity for each range of impact values, such as moderate, severe, or fatal injuries. In other embodiments, column 601 may include a list of probable injury types for each impact range. Alternatively, column 601 may be a prediction of vehicle damage probability or severity instead of an injury measurement. The impact data in column 602 is not limited to Delta V, but may be any of the parameters discussed above, such as accelerations, velocities, or integrals or derivatives thereof.

Column 602 lists exemplary ranges of values for forward, rear, side and vertical impacts, but can be expanded to cover impacts for any specific or general angle, such as values for impacts in a forward or rear quarter of the vehicle or for impacts spread at every 10 degrees, for example. Table 600 may be specific to a particular make and model of vehicle or for a particular type of passenger, based upon age, sex, weight, height, etc. Upon receiving impact data from a vehicle monitoring device, such as the data illustrated in FIGS. 4 and 5, the central monitoring server may access data, such as that shown in table 600, to access the injury probability for the vehicle occupants. Based upon the observed impact parameters (602) and the associated injury probability or severity (602), the central server would then provide the appropriate emergency response personnel with this information.

Vehicle monitoring systems using embodiments of the invention may collect data according to the Society of Automotive Engineers (SAE) J211 standard, parts 1 and 2, entitled INSTRUMENTATION FOR IMPACT TEST—PART 1—ELECTRONIC INSTRUMENTATION and INSTRUMENTATION FOR IMPACT TEST—PART 2—PHOTOGRAPHIC INSTRUMENTATION, respectively, the disclosures of which are hereby incorporated by reference herein in their entirety. The SAE J211 standard is a data acquisition standard that defines acceptable data filtering and sample rates with suitable corner frequencies. Preferably, a vehicle monitoring system would adhere to the SAE J211 standard which is also followed by the National Highway Traffic Safety Administration (NHTSA) and the Insurance Institute for Highway Safety (IIHS) during the capture and acquisition of accident severity (delta V). The J211 standard also defines Channel Filter Class filtering schemes.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method for providing real-time notice from a vehicle involved in a crash to at least one of emergency responders and insurance companies, comprising:
    storing at a remote server system for one or more vehicle types comprised of either a specific vehicle make, model and year, or a vehicle class, data which is accumulated over time and used to generate one or more models used to statistically predict severity of injury to occupants of a vehicle or severity of damage to the vehicle in the event of a crash;
    receiving at the remote server system from a processor of the on-board vehicle monitoring system, data associated with a crash event from one or more on-board vehicle monitoring devices which monitor 1) location of the vehicle, 2) date and time, 3) operating conditions for the vehicle, 4) vehicle crash conditions, 5) vehicle occupants, and which also monitors, if available, personal information for one or more vehicle occupants;
    adding the received data to the database at the remote server system;
    at the remote server system, correlating the received data with data in the database to identify one or both of 1) predicted parameters associated with one or more injury severity thresholds based on the type of vehicle, the received data, and one or more models in the database, or 2) predicted parameters associated with one or more damage severity thresholds based on the type of vehicle, the received data and one or more models in the database; and
    based on the correlation sending out one or more notifications comprised of one or both of a notification of the severity of the crash and possible injury severity predicted by the one or more models, and a notification of the possible vehicle damage predicted by the one or more models, said one or both notifications being sent to one or both of an emergency responder and an insurance carrier.

2. The method of claim 1, wherein personal information for a driver or one or more other vehicle occupants is uploaded by the driver to the on-board vehicle monitoring system.

3. The method of claim 2, wherein the personal information is uploaded from a digital storage device to the on-board vehicle monitoring system.

4. The method of claim 1, wherein personal information for a driver or one or more vehicle occupants is uploaded to the vehicle monitoring system from an RFID tag carried by the driver or one or more vehicle occupants.

5. The method of claim 3 or 4, wherein the personal information comprises parameters selected from the group consisting of:
   age;
   weight;
   height;
   sex;
   position in the vehicle;
   use of seat belts; and
   medical history.

6. The method of claim 1, wherein the crash data is associated with a single or multiple vehicle crash, collision, or accident impact.

7. The method of claim 1, wherein the crash data comprises a change of velocity (delta V) observed during a crash.

8. The method of claim 1, wherein the crash data comprises an acceleration observed during the crash.

9. The method of claim 1, wherein the crash data comprises a crash pulse duration observed during the crash.

10. The method of claim 1, wherein the crash data comprises an indication of seat belt use or airbag deployment or both during the crash.

11. The method of claim 1 wherein additional information is uploaded to the database after the crash event, comprising occupant injury data.

12. The method of claim 1, wherein additional information is uploaded to the database after the crash event, comprising medical treatment cost data.

13. The method of claim 1 wherein additional information is uploaded to the database after the crash event, comprising vehicle damage data.

14. The method of claim 1, wherein additional information is uploaded to the database after the crash event, comprising vehicle repair cost data.

15. A system for providing real-time notice from a vehicle involved in a crash to at least one of emergency responders and insurance companies, comprising:
   a remote server system for storing one or more vehicle types comprised of either a specific vehicle make, model and year, or a vehicle class, and data which is accumulated over time and used to generate one or more models used to statistically predict severity of injury to occupants of a vehicle or severity of damage to the vehicle in the event of a crash;
   an on-board vehicle monitoring system comprised of a plurality of sensors for detecting data associated with a crash event by monitoring 1) location of the vehicle, 2) date and time, 3) operating conditions for the vehicle, 4) vehicle crash conditions, 5) vehicle occupants, and the on-board vehicle monitoring system also providing one or more sensors for detecting, if available, personal information for one or more vehicle occupants;
   a communications network through which the data detected at the on-board vehicle monitoring system is communicated to the remote server system to enable the remote server system to add the data received from the on-board monitoring system to the database, and then correlate the received data with data in the database to identify one or both of 1) predicted parameters associated with one or more injury severity thresholds based on the type of vehicle, the received data, and one or more models in the database, or 2) predicted parameters associated with one or more damage severity thresholds based on the type of vehicle, the received data and one or more models in the database; and
   one or more emergency responders or insurance carriers connected to the communications network for receiving from the remote server system one or more notifications comprised of one or both of a notification of the severity of the crash and possible injury severity predicted by the one or more models, and a notification of the possible vehicle damage predicted by the one or more models, said one or both notifications being sent to one or both of an emergency responder and an insurance carrier.

16. The system of claim 15, wherein personal information for a driver or one or more other vehicle occupants is uploaded by the driver to the on-board vehicle monitoring system.

17. The system of claim 16, wherein the personal information is uploaded from a digital storage device to the on-board vehicle monitoring system.

18. The system of claim 15, wherein personal information for a driver or one or more vehicle occupants is uploaded to the vehicle monitoring system from an RFID tag carried by the driver or one or more vehicle occupants.

19. The system of claim 17 or 18, wherein the personal Information comprises parameters selected from the group consisting of:
   age;
   weight;
   height;
   sex;
   position in the vehicle;
   use of seat belts; and
   medical history.

20. The system of claim 15, wherein the crash data is associated with a single or multiple vehicle crash, collision, or accident impact.

21. The system of claim 15, wherein the crash data comprises a change of velocity (delta V) observed during a crash.

22. The system of claim 15, wherein the crash data comprises an acceleration observed during the crash.

23. The system of claim 15, wherein the crash data comprises a crash pulse duration observed during the crash.

24. The system of claim 15, wherein the crash data comprises an indication of seat belt use or airbag deployment or both during the crash.

25. The system of claim 15, wherein additional information is uploaded to the database after the crash event, comprising occupant injury data.

26. The system of claim 15, wherein additional information is uploaded to the database after the crash event, comprising medical treatment cost data.

27. The system of claim 15 wherein additional information is uploaded to the database after the crash event, comprising vehicle damage data.

28. The system of claim 15, wherein additional information is uploaded to the database after the crash event, comprising vehicle repair cost data.

* * * * *